June 23, 1925.
B. L. METZGER ET AL
CIGAR LIGHTER
Filed March 26, 1924
1,543,290
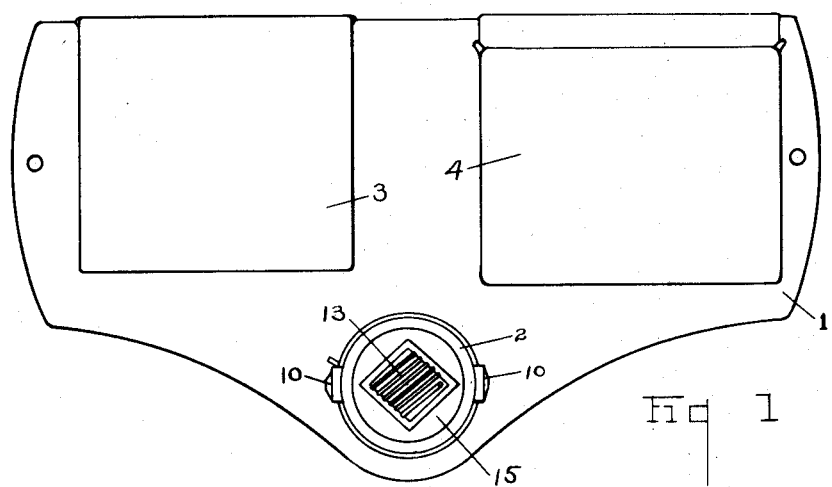
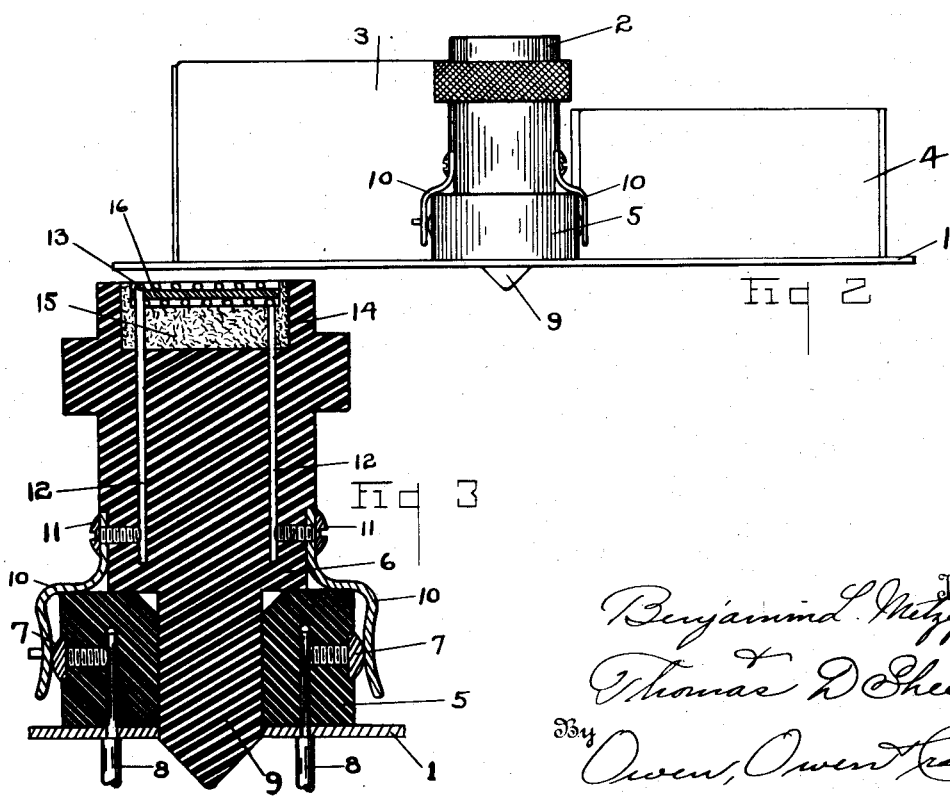

Patented June 23, 1925.

UNITED STATES PATENT OFFICE.

BENJAMIN L. METZGER AND THOMAS D. SHEELY, OF TOLEDO, OHIO.

CIGAR LIGHTER.

Application filed March 26, 1924. Serial No. 701,925.

*To all whom it may concern:*

Be it known that we, BENJAMIN L. METZGER and THOMAS D. SHEELY, citizens of the United States, and residents of Toledo, in the county of Lucas and State of Ohio, have invented a new and useful Cigar Lighter, which invention is fully set forth in the following specification.

Our invention has for its object to provide an exceedingly simple and efficient cigar, cigarette and pipe lighter. The cigar lighter is electrically heated and consequently may be used in any place where electrical connection may be made, such as in a building or in a train or in an automobile. It is particularly advantageous when located in an automobile because of the inconvenience or difficulty experienced in lighting a cigar, cigarette or pipe by the use of a match, on account of the movement of the automobile through the air.

The embodiments of the invention are so constructed that while the lighting element is electrically heated, yet in the use of the invention, the lighting element is disconnected from the electric circuit, it being so constructed as to retain its lighting power, notwithstanding the disconnection. This eliminates the inconvenience that arises by reason of connecting flexible wires extending between the lighting element and the electrical system of the automobile, vehicle or building. Thus, the cigar lighter may be conveniently handled and passed to individuals located in different parts of the car and at points more or less remote from the fixed support of the cigar lighter.

Other advantages and features of the invention will appear on examination of structures containing the invention, such as, the structures are preferably so formed that tobacco contained in pipes may be readily lighted, and a means is provided for permitting the current to pass through the lighting element for a period of time in order that it may be sufficiently heated.

The invention may be contained in structures of different forms. To illustrate a practical application of the invention, we have selected a structure containing the invention and shall describe it hereinafter. The structure selected is shown in the accompanying drawings.

Figure 1 of the drawings illustrates a top view of the heater and a convenient tray or bracket for receiving ashes and supporting cigarettes. Figure 2 illustrates an edge view of the bracket and cigar lighter shown in Figure 1. Figure 3 illustrates a sectional view of the cigar lighter.

The cigar lighter may be located on a plate 1 that may be mounted on the instrument board of an automobile. The plate may be provided not only with the cigar lighter 2 but also with a container or receptacle 3 for ashes, and a pocket or box 4 for cigarettes.

The cigar lighter 2 is formed of two parts comprising a ring or socket 5 and the plug 6. The ring 5 is provided with a pair of contact points 7 that are connected to the electrical circuit of the automobile by means of the wires 8. The contacts 7 may be screws that thread into the ring 5 and make contact with the wires 8, the ring 5 being preferably of an insulating material. The plug 6 is provided with a finger or shank 9 that fits into the interior of the ring 5, the ring 5 having considerable thickness and the shank 9 having considerable length, and the two inter-fitting, the plug 6 will be held within the ring 5 notwithstanding considerable vibration or jarring due to the moving of the car over the road. The plug 6 is not only held in position by means of the ring 5 and the shank 9 but also by means of the spring contacts 10 that are connected to the plug 6, which elastically engage either the surface of the ring 5 or the contacts 7.

The contacts 10 are connected to the plug 6 by means of the screws 11 that thread into the plug and engage or are otherwise connected with the wires 12. When, therefore, the plug 6 is turned so as to place the springs 10 in contact with the contacts 7, a connection is established between the wires 12 and the wires 8. The wires 12 are connected to the heating, that is, the cigar lighting element 13. The cigar lighting element 13 is an electrical resistance member of the type well known in the art, and when the circuit is completed through the wires 12 and 8 to the source of current supply, it will become red hot so that tobacco may be lighted therewith.

The resistance element is located in the end of the plug 6 and preferably in a recess 14. It is well backed and surrounded by asbestos 15 in order that its temperature may not be readily reduced, and so that when it has been heated to the desired temperature, it will be maintained substantially at the temperature to which it is raised. When, therefore, it is desired to light tobacco as contained in a cigar or cigarette, the plug of the cigar lighter is rotated until the contacts 10 are brought into contact with the contacts 7, which establishes electrical connection between the source of electrical current and the resistance element. This will cause the element 13 to become heated to a sufficient temperature to ignite the tobacco. A suitable stop 17 may be inserted in proximity to one of the contacts 7, so as to limit the rotative movement of the plug 6 whereby the spring contacts 10 may be readily placed in contact with the contacts 7. The plug may thus be rotated until it is held from further rotation by the stop 17 and when in this position the circuit will be established with the heat element. The plug may then be removed from its supporting socket and conveniently used for lighting a cigar or cigarette. The element 13 is preferably located substantially flush or slightly above the surface that forms the end of the plug, whereby the upper end of the plug may be inserted in a pipe to light tobacco that may have been placed in the pipe. Also this location of the element 13 relative to the end of the plug prevents the collection of ash in the end of the plug since the ashes and other particles cannot easily collect between the turns of the resistance element.

The resistance element is formed of wire that may be wound about a strip 16 of mica. The mica strip forms an insulating support for the turns of the resistance element. The mica may be made in the form of a square piece of sheet material which produces an efficient tobacco lighting area at the end of the cigar lighter.

We claim:—

In a cigar lighter, a source of electric current, a removable rotatable member, an electrical heat element located in the end of the rotatable member, contacts located on the rotatable member and connected to the electrical heat element, a stationary member for receiving and rotatably supporting the said rotatable member and having contacts for making contact with the contacts of the rotatable member when the rotatable member is rotated to a certain point, the said contacts opened by rotating the said rotatable member to another point, the contacts of the stationary member connected to the source of current.

In testimony whereof, we have hereunto signed our names to this specification.

BENJAMIN L. METZGER.
THOMAS D. SHEELY.